United States Patent
Vohra et al.

(10) Patent No.: US 8,074,101 B1
(45) Date of Patent: Dec. 6, 2011

(54) SYSTEMS AND METHODS FOR HANDLING PATH FAILURES TO ACTIVE-PASSIVE STORAGE ARRAYS

(75) Inventors: Taher Vohra, Sunnyvale, CA (US); Abhay Singh, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 57 days.

(21) Appl. No.: 12/608,178

(22) Filed: Oct. 29, 2009

(51) Int. Cl.
*G06F 11/00* (2006.01)

(52) U.S. Cl. .......... 714/5.1; 714/4.1; 714/4.11; 714/4.2; 714/43; 714/48

(58) Field of Classification Search .................. 714/4, 5, 714/43, 47, 48, 4.1, 4.11, 4.2, 5.1, 47.1
See application file for complete search history.

(56) References Cited

U.S. PATENT DOCUMENTS

| | | | |
|---|---|---|---|
| 7,272,674 B1 * | 9/2007 | Nandi et al. ..................... 710/38 |
| 7,318,138 B1 * | 1/2008 | Usgaonkar et al. ........... 711/163 |
| 7,401,251 B1 * | 7/2008 | Haynes et al. ..................... 714/5 |
| 7,694,063 B1 * | 4/2010 | Nandi et al. .................. 710/316 |
| 7,778,157 B1 * | 8/2010 | Tawri et al. ................... 370/216 |

* cited by examiner

*Primary Examiner* — Charles Ehne
(74) *Attorney, Agent, or Firm* — Advantedge Law Group (57) ABSTRACT

A computer-implemented method for handling path failures to active-passive storage arrays may include identifying a host system with multiple I/O paths to an active-passive storage array. The computer-implemented method may also include identifying a backup system operating for the host system, the backup system having multiple I/O paths to the active-passive storage array. The computer-implemented method may also include disabling at least one secondary path from the backup system to the active-passive storage array. The computer-implemented method may further include detecting a path failure. The computer-implemented method may additionally include reconfiguring the backup system to access the active-passive storage array through the host system. Various other methods, systems, and computer-readable media are also disclosed.

20 Claims, 5 Drawing Sheets

SYSTEMS AND METHODS FOR HANDLING PATH FAILURES TO ACTIVE-PASSIVE STORAGE ARRAYS

BACKGROUND

Organizations increasingly depend on digitally-stored data in the course of business. For this reason, many organizations may employ a backup system, such as a continuous data protection appliance, to protect their data.

In a common configuration, a continuous data protection appliance continuously backs up data from a host system. The continuous data protection appliance may need access to the host data from the same storage system which the host uses to store its data. Furthermore, the host system and the continuous data protection appliance may each connect to the storage system via one of multiple available input/output paths. If one path fails between the storage system and another system (either the host system or the continuous data protection appliance), the system may use another available input/output path.

Unfortunately, if the storage system is an active-passive array, switching paths after path failure may lead to a path conflict and may, consequently, degrade and/or disrupt application I/O from the host system while the continuous data protection system backs up or restores host data. Since application I/O performance may take priority over continuous data protection I/O performance, any interference with application I/O on account of a continuous data protection system may be unacceptable. Accordingly, the instant disclosure addresses a need for systems and methods that handle path failures to active-passive storage arrays without creating path conflicts.

SUMMARY

As will be described in greater detail below, the instant disclosure generally relates to systems and methods for handling path failures to active-passive storage arrays. Embodiments of the instant disclosure may handle path failures to active-passive storage arrays, without causing path conflicts such as trespass and/or thrashing, by routing I/O traffic from a continuous data protection appliance through a host system in the case of path failure. In one example, various systems described herein may accomplish this task by: 1) identifying a host system with multiple I/O paths to an active-passive storage array, 2) identifying a backup system operating for the host system, the backup system having multiple I/O paths to the active-passive storage array, 3) disabling at least one secondary path from the backup system to the active-passive storage array, 4) detecting a path failure, and 5) reconfiguring the backup system to access the active-passive storage array through the host system.

In some examples, identifying the backup system operating for the host system may include identifying a continuous data protection system. In certain embodiments, disabling at least one secondary path from the backup system to the active-passive storage array may include disabling all secondary paths from the backup system to the active-passive storage array.

According to some embodiments, detecting the path failure may include detecting a path failure from the backup system to the active-passive storage array. In various examples, detecting the path failure may include detecting a path failure from the host system to the active-passive storage array. In certain embodiments, detecting the path failure may include detecting the path failure of a backup operation by the backup system and/or a restore operation by the backup system.

In various examples, reconfiguring the backup system to access the active-passive storage array through the host system may include switching the backup system to a direct-attached storage mode. In some embodiments, reconfiguring the backup system to access the active-passive storage array through the host system may include directing I/O requests from the backup system to a splitter on the host system and/or directing I/O requests from the backup system to an agent on the host system.

According to certain embodiments, the various systems described herein may also perform a backup operation through the backup system, at least a part of the backup operation routing through the host system to the active-passive storage array. Additionally or alternatively, the various systems described herein may perform a restore operation through the backup system, at least a part of the restore operation routing through the host system to the active-passive storage array.

In some examples, a system for handling path failures to active-passive storage arrays may include an identification module, a disabling module, a detection module, and a reconfiguration module. The identification module may be programmed to identify a host system with multiple I/O paths to an active-passive storage array. The identification module may also be programmed to identify a backup system operating for the host system, the backup system having multiple I/O paths to the active-passive storage array. The disabling module may be programmed to disable at least one secondary path from the backup system to the active-passive storage array. The reconfiguration module may be programmed to reconfigure the backup system to access the active-passive storage array through the host system.

In certain embodiments, the identification module may be programmed to identify the backup system by identifying a continuous data protection system. In various examples, the detection module may be programmed to detect the path failure by detecting a path failure from the backup system to the active-passive storage array. In some examples, the detection module may be programmed to detect the path failure by detecting a path failure from the host system to the active-passive storage array. In some embodiments, the detection module may be programmed to detect the path failure during a backup operation by the backup system and/or a restore operating by the backup system.

In various embodiments, the disabling module may be programmed to disable at least one secondary path from the backup system to the active-passive storage array by disabling all secondary paths from the backup system to the active-passive storage array. In some examples, the reconfiguration module may be programmed to reconfigure the backup system to access the active-passive storage array through the host system by switching the backup system to a direct-attached storage mode. In certain embodiments, the reconfiguration module may be programmed to reconfigure the backup system to access the active-passive storage array through the host system by directing I/O requests from the backup system to a splitter on the host system and/or directing I/O requests from the backup system to an agent on the host system.

In various embodiments, the system for handling path failures to active-passive storage arrays may also include a backup module. In some examples, the backup module may be programmed to perform a backup operation through the backup system. At least a part of the backup operation may route through the host system to the active-passive storage array. Additionally or alternatively, the backup module may be programmed to perform a restore operation through the backup system. At least a part of the restore operation may route through the host system to the active-passive storage array.

In some embodiments, a computer-readable-storage medium may include one or more computer-executable instructions that, when executed by at least one processor of a computing device, cause the computing device to identify a host system with multiple I/O paths to an active-passive storage array, identify a backup system operating for the host system, the backup system having multiple I/O paths to the active-passive storage array, disable at least one secondary path from the backup system to the active-passive storage array, detect a path failure, and reconfigure the backup system to access the active-passive storage array through the host system. In certain embodiments, the computer-executable instructions may cause the computing device to identify the backup system by causing the computing device to identify a continuous data protection system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for handling path failures to active-passive storage arrays. In one example, the various systems described herein may accomplish this task by: 1) identifying a host system with multiple I/O paths to an active-passive storage array, 2) identifying a backup system operating for the host system, the backup system having multiple I/O paths to the active passive storage array, 3) disabling at least one secondary path from the backup system to the active-passive storage array, 4) detecting a path failure, and 5) reconfiguring the backup system to access the active-passive storage array through the host system.

As will be explained below, by disabling secondary paths from the backup system to the active-passive storage array and, upon detecting a path failure, reconfiguring the backup system to access the active-passive storage array through the host system, various systems and methods described herein may better handle path failures by avoiding disruption in application I/O after path failures. Systems and methods described herein may also allow the use of an active-passive storage array without requiring specific failover configurations (such as an implicit failover mode or an asymmetric active-active mode), without relying on specific SCSI commands, and/or without risking disruption in application I/O.

Figure 1:
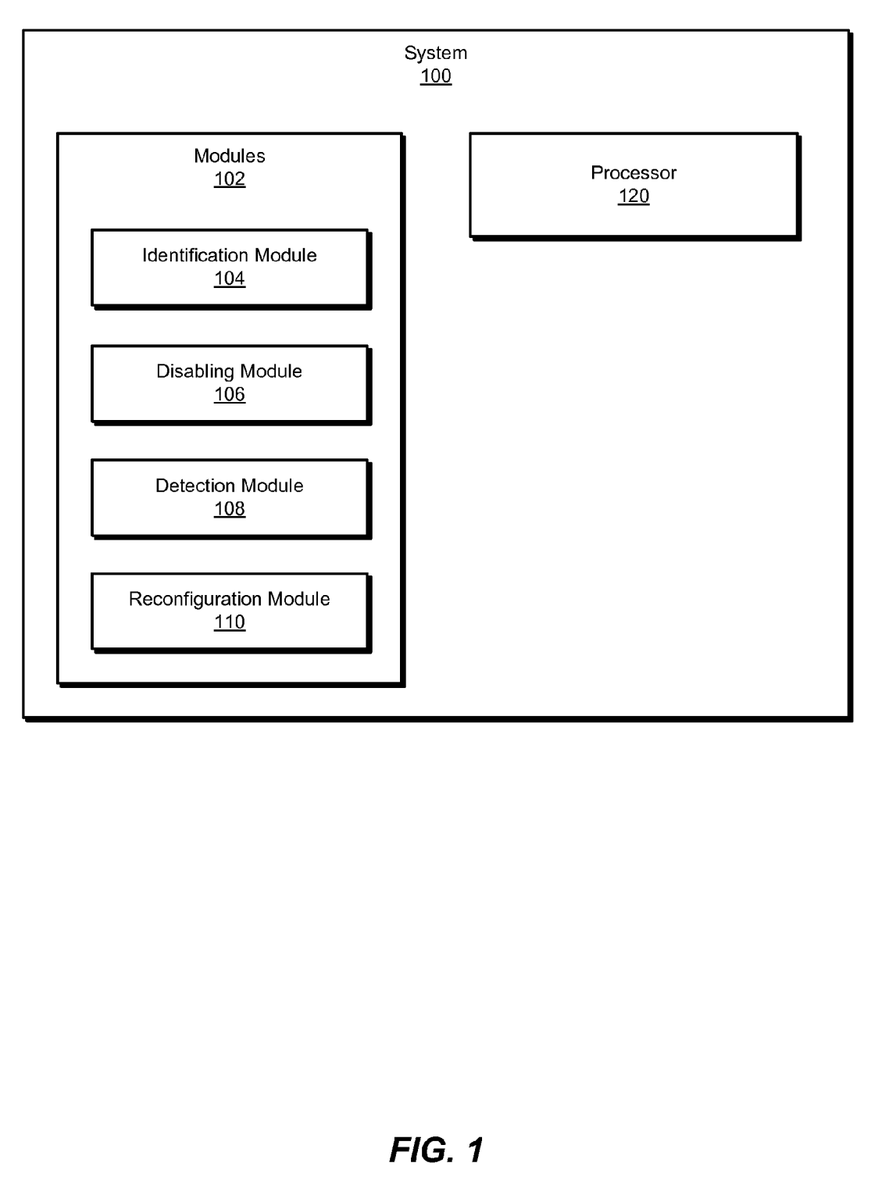
FIG. 1 is a block diagram of an exemplary system for handling path failures to active-passive storage arrays.
Figure 2:
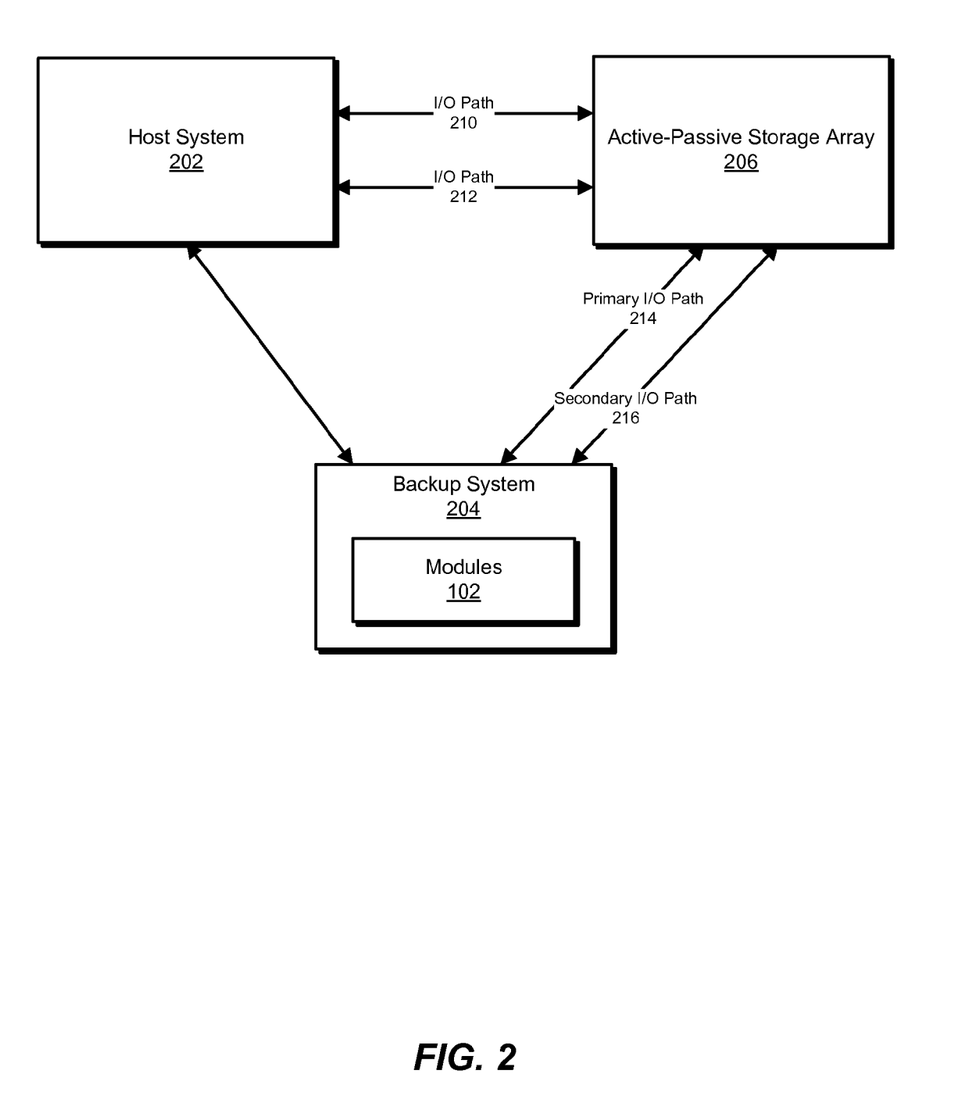
FIG. 2 is a block diagram of an exemplary system for handling path failures to active-passive storage arrays.

The following will provide, with reference to FIGS. 1-2, detailed descriptions of exemplary systems for handling path failures to active-passive storage arrays. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for handling path failures to active-passive storage arrays. As illustrated in this figure, exemplary system 100 may include one or more modules 102 for performing one or more tasks. For example, and as will be explained in greater detail below, exemplary system 100 may include an identification module 104 programmed to identify a host system with multiple I/O paths to an active-passive storage array and to identify a backup system operating for the host system that has multiple I/O paths to the active-passive storage array. Exemplary system 100 may also include a disabling module 106 programmed to disable at least one secondary path from the backup system to the active-passive storage array.

In addition, and as will be described in greater detail below, exemplary system 100 may include a detection module 108 programmed to detect a path failure. Exemplary system 100 may further include a reconfiguration module 110 programmed to reconfigure the backup system to access the active-passive storage array through the host system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., host system 202 and/or backup system 204), computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include at least one processor 120. Processor 120 may be configured to execute at least a portion of identification module 104, disabling module 106, detection module 108, and/or reconfiguration module 110.

Processor 120 in FIG. 1 may represent a portion of one or more computing devices. For example, processor 120 may represent a portion of host system 202 in FIG. 2, backup system 204 in FIG. 2, and/or computing system 410 in FIG. 4.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a host system 202 in communication with a backup system 204 and an active-passage storage array 206. Host system 202 may communicate with active-passive storage array 206 via I/O path 210 and/or I/O path 212. Backup system 204 may communicate with active-passive storage array 206 via primary I/O path 214 and/or secondary I/O path 216. In one embodiment, and as will be described in greater detail below, backup system 204 may be programmed to disable at least one secondary path from backup system 204 to active-passive storage array 206 and then, upon detecting a path failure, reconfigure backup system 204 to access active-passive storage array 206 through the host system.

For example, identification module 104 may identify host system 202 with I/O paths 210 and 212 to active-passive storage array 206. Identification module 104 may also identify backup system 204 with primary I/O path 214 and secondary I/O path 216 to active-passive storage array 206. Disabling module 106 may disable at least one secondary path (such as secondary I/O path 216) from backup system 204 to active-passive storage array 206.

At some point, detection module 108 may detect a path failure (e.g., a failure in I/O path 210, I/O path 212, primary I/O path 214, or secondary I/O path 216). Reconfiguration module 110 may then reconfigure backup system 204 to access active-passive storage array 206 through host system 202.

Host system 202 generally represents any type or form of computing device capable of reading computer-executable instructions. Examples of host system 202 include, without limitation, laptops, desktops, servers, cellular phones, personal digital assistants (PDAs), multimedia players, embedded systems, combinations of one or more of the same, exemplary computing system 410 in FIG. 4, or any other suitable computing device.

Backup system 204 generally represents any type or form of computing device that is capable of performing a backup function for a computing system. Examples of backup system 204 include, without limitation, continuous data protection appliances and servers configured to run backup and/or replication, deduplication, compression or encryption software.

The I/O paths (such as I/O path 210, I/O path 212, primary I/O path 214, and secondary I/O path 216) generally represent any medium or architecture capable of facilitating communication or data transfer. The I/O paths may represent portions of exemplary network architecture 500 in FIG. 5. The I/O paths may facilitate communication or data transfer using wireless or wired connections. Components of the I/O paths may include, without limitation, cables, transmitters, switches, controllers, and/or software modules. While FIG. 2 shows two I/O paths between host system 202 and active-passive storage array 206, any other number of I/O paths may transfer data between host system 202 and active-passive storage array 206. Similarly, any number of I/O paths may transfer data between active-passive storage array 206 and backup system 204.

Figure 3:
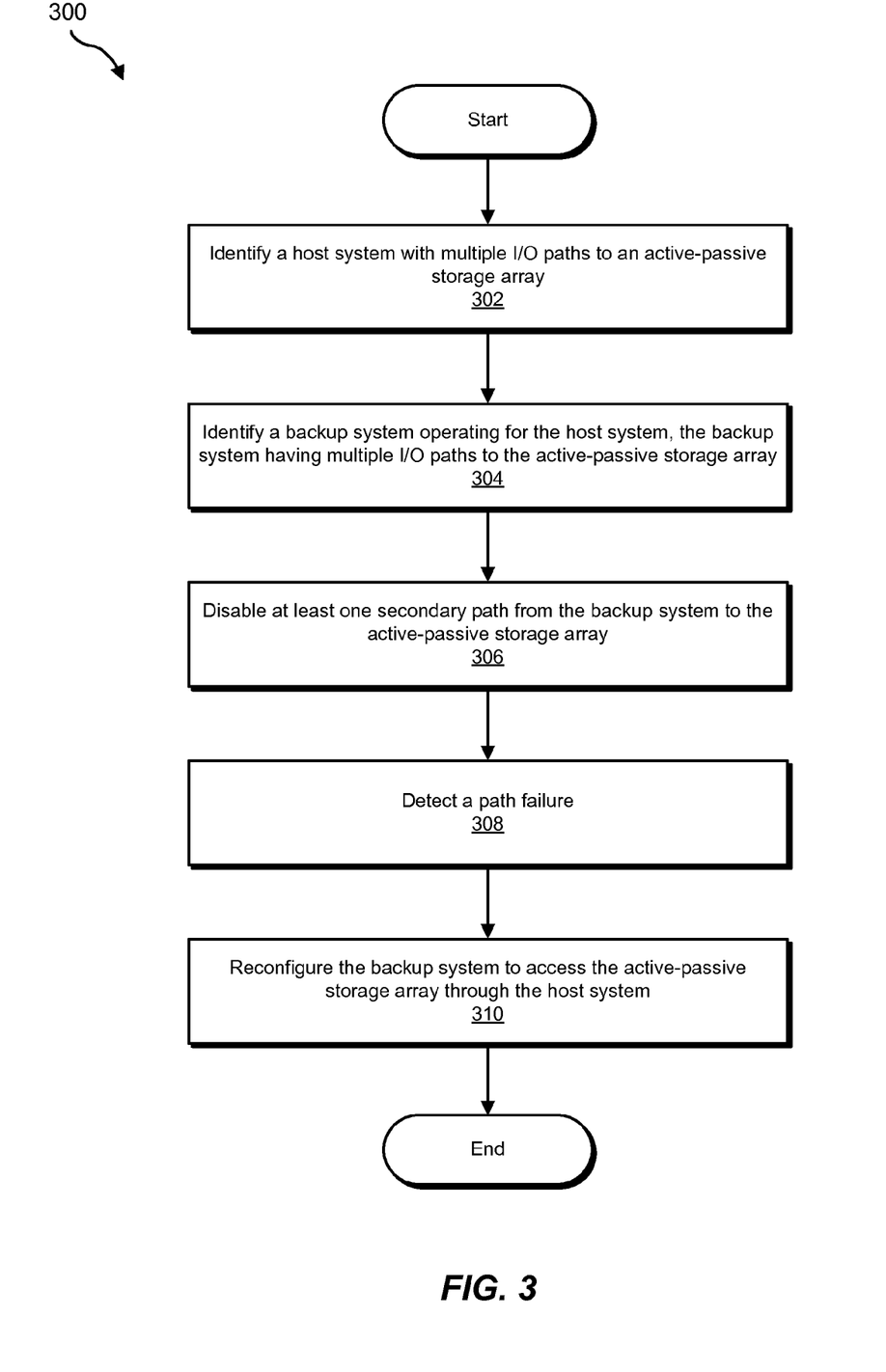
FIG. 3 is a flow diagram of an exemplary method for handling path failures to active-passive storage arrays.

FIG. 3 is a flow diagram of an exemplary computer-implemented method 300 for handling path failures to active-passive storage arrays. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a host system with multiple I/O paths to an active-passive storage array. For example, at step 302 identification module 104 may, as part of backup system 204, identify host system 202 with I/O path 210 and I/O path 212 to active-passive storage array 206.

As used herein, a "host system" may refer to any computing system capable of utilizing backup services from a backup system. Likewise, an "I/O path" may refer to any element or series of elements in a data transfer infrastructure, such as cables, transmitters, switches, controllers, storage processors, and/or software modules. An "active-passive storage array" may refer to any storage system which may function suboptimally after certain path failures, such as a storage system with multiple controllers that each have exclusive access to their respective assigned logical units.

Identification module 104 may identify the host system in any suitable manner. For example, identification module 104 may read a configuration file that identifies the host system. Additionally or alternatively, identification module 104 may receive a communication from the host system that directly or indirectly identifies the host system.

Returning to FIG. 3, at step 304 one or more of the systems described herein may identify a backup system operating for the host system. The backup system may have multiple I/O paths to an active-passive storage array. For example, at step 304 identification module 104 may, as part of backup system 204, identify backup system 204. Backup system 204 may communicate with active-passive storage array 206 over primary I/O path 214 and secondary I/O path 216.

Identification module 104 may identify the backup system in any suitable manner. For example, identification module 104 may read a configuration file that identifies the host system. Additionally or alternatively, identification module 104 may receive a communication from the backup system that directly or indirectly identifies the backup system. In some examples, identification module 104 may identify the backup system by being executed by the backup system.

Identification module 104 may identify any suitable system as the backup system. For example, identification module 104 may identify the backup system by identifying a continuous data protection system. As used herein, the phrase "continuous data protection system" may refer to any system, device, and/or appliance configured to provide continuous and/or real-time backup services.

Returning to FIG. 3, at step 306 one or more of the systems described herein may disable at least one secondary path from the backup system to the active-passive storage array. For example, at step 306 disabling module 106 may, as part of backup system 204, disable secondary I/O path 216. As used herein, a "primary path" may refer to any I/O path that is primary, actively being used, configured for use by default, and/or configured for use prior to other paths. As used herein, a "secondary path" may refer to any I/O path other than the primary path.

Disabling module 106 may disable the secondary path in a variety of ways. For example, disabling module 106 may disable the secondary path by configuring the backup system not to use and/or recognize the secondary path. Additionally or alternatively, disabling module 106 may disable the secondary path by configuring the active-passive storage array not to use and/or recognize the secondary path. In some examples, disabling module 106 may disable the secondary path by disabling and/or reconfiguring a necessary component for the secondary path.

In some cases, disabling module 106 may disable multiple and/or all secondary paths from the backup system to the active-passive storage array. For example, if there are five paths from the backup system to the active-passive storage array, disabling module 106 may disable four paths, leaving only a single primary path available for communication between the backup system and the active-passive storage array. As will be described in greater detail below, this may ensure that the backup system doesn't fail over from the primary path to a secondary path that may cause interference with I/O communications between the host system and the active-passive storage array.

Returning to FIG. 3, at step 308 one or more of the systems described herein may detect a path failure. For example, at step 308 detection module 108 may, as part of backup system 204, detect a path failure of I/O path 210, I/O path 212, or primary I/O path 214. As used herein, a "path failure" may refer to an I/O path becoming unavailable and/or unsuited for I/O communications for any reason, including, without limitation, hardware faults, software errors, and/or administrative commands to shut down the I/O path and/or a component of the I/O path.

Detection module 108 may detect the path failure in any suitable manner. For example, detection module 108 may detect the path failure by receiving an error message. Additionally or alternatively, detection module 108 may detect the path failure by failing to receive a response to a communication attempt. In some examples, detection module 108 may detect the path failure by receiving a communication from a system, such as the host system, that a path has failed.

Detection module 108 may detect the failure of a variety of paths. For example, detection module 108 may detect a path failure from the backup system to the active-passive storage array (such as primary I/O path 214). Additionally or alternatively, detection module 108 may detect a path failure from the host system to the active-passive storage array.

Detection module 108 may detect the path failure in a variety of contexts. For example, detection module 108 may detect the path failure during a backup operation by the backup system. In some cases, the backup operation may include an initial copy performed by a real-time backup system (i.e., a full copy of the data to backup). Additionally or alternatively, detection module 108 may detect the path failure during a restore operation by the backup system (e.g., an operation to restore or resync data from the active-passive storage array to the host system).

Returning to FIG. 3, at step 310 one or more of the systems described herein may reconfigure the backup system to access the active-passive storage array through the host system. For example, at step 310 reconfiguration module 110 may, as part of backup system 204, reconfigure backup system 204 to access active-passive storage array 206 through host system 202.

Reconfiguration module 110 may reconfigure the backup system to access the active-passive storage array through the host system in a variety of ways. For example, reconfiguration module 110 may reconfigure the backup system by switching the backup system to a direct-attached storage mode. For example, the backup system may be capable of interfacing with the active-passive storage array directly when operating in a storage-area-network mode. The backup system may be capable of instead interfacing with the active-passive storage array through the host system when operating in a direct-attached storage mode. As used herein, the phrase "direct-attached storage mode" may refer to any mode of communication in which the last step to the storage does not include a network traversal (e.g., the host system may be directly attached to the active-passive storage array rather than attached to the array across a network) and/or any mode of communication intermediated by another system (e.g., the host system may mediate communication between the active-passive storage array and the backup system). Additionally or alternatively, the phrase "direct-attached storage mode" may refer to any mode of operation in which the backup system cannot detect, access and/or issue I/O communications to the active-passive storage array (e.g., because a clustering solution on the host system uses SCSI-2 reservations).

Reconfiguration module 110 may also reconfigure the backup system to access the active-passive storage array through the host system by directing I/O requests from the backup system to a splitter or an agent on the host system. For example, reconfiguration module 110 may direct I/O requests that the backup system sends to the active-passive storage array to a splitter or an agent on the host system (e.g., to be forwarded on to the active-passive storage array). The splitter or agent may include portions of any suitable hardware and/or software, such as a file system driver and/or storage filter driver.

In some embodiments, one or more of the systems described herein may also perform a backup operation through the backup system. At least part of the backup operation may route through the host system to the active-passive storage array. For example, the backup system may begin performing an initial copy of the data of the host system in a network-area-storage mode. After detection module 108 detects a path failure and reconfiguration module 110 reconfigures the backup system, the backup system may complete the backup in a direct-attached-storage mode.

Likewise, one or more of the systems described herein may also perform a restore operation through the backup system (such as a resync operation). At least part of the restore operation may route through the host system to the active-passive storage array. In this manner, if a path failover occurs between the host system and the active-passive storage array during a resync operation, the backup system may avoid attempting the resync operation again and possibly causing a trespass scenario at the active-passive storage array.

By disabling secondary paths from the backup system to the active-passive storage array, if the primary path between the backup system and the active-passive storage array fails the backup system may avoid failing over to a secondary path. By not failing over to a secondary path, the backup system may avoid interfering with application I/O from the host system to the active-passive storage array by avoiding trespass or thrashing conditions. Likewise, by relying on the host system for communication with the active-passive storage array in the case of a path failure between the host system and the active-passive storage array, the backup system may avoid interfering with application I/O from the host system by ensuring that no communication on the primary path will conflict with the new path used by the host system.

Figure 4:
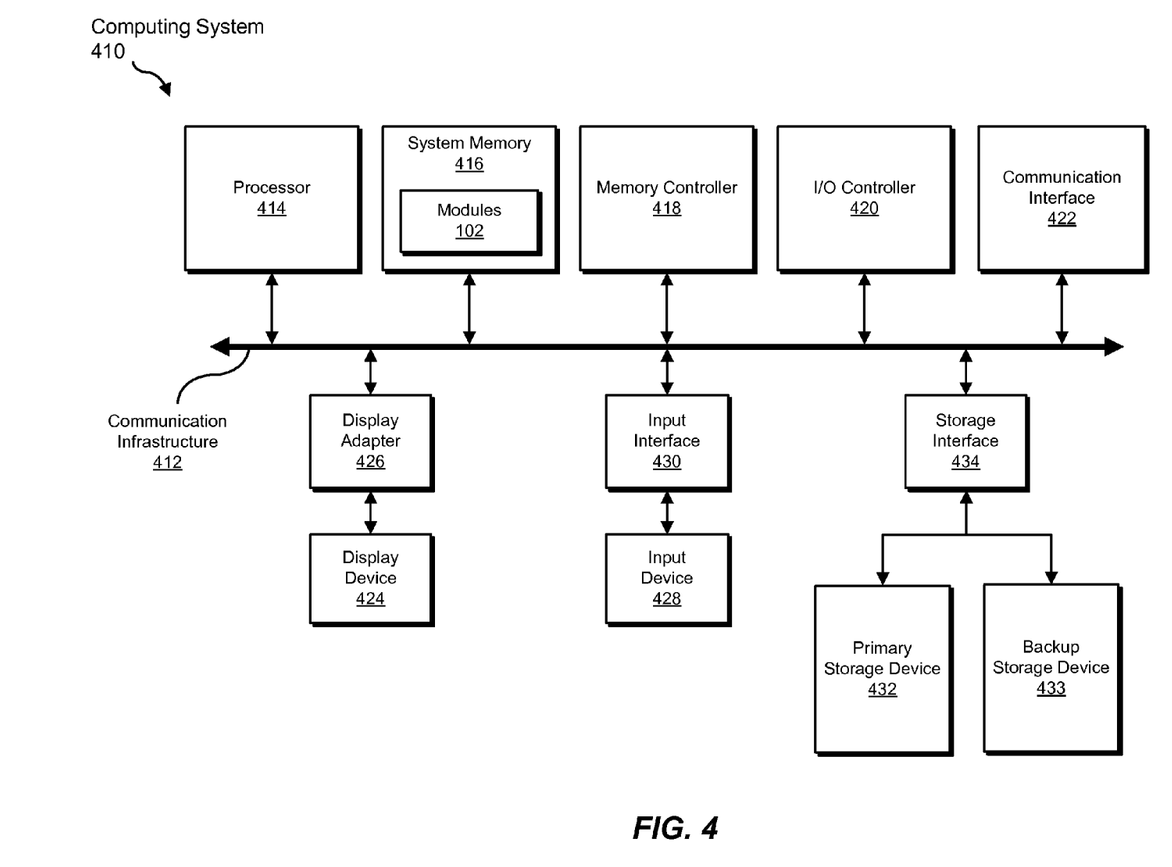
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein. For example, processor 414 may perform and/or be a means for performing, either alone or in combination with other elements, one or more of the identifying, disabling, detecting, switching, directing, reconfiguring, handling, and/or performing steps described herein. Processor 414 may also perform and/or be a means for performing any other steps, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller 418 may perform and/or be a means for performing, either alone or in combination with other elements, one or more of the steps or features described and/or illustrated herein, such as identifying, disabling, detecting, switching, directing, reconfiguring, handling, and/or performing.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434. I/O controller 420 may be used, for example, to perform and/or be a means for performing, either alone or in combination with other elements, one or more of the identifying, disabling, detecting, switching, directing, reconfiguring, handling, and/or performing steps described herein. I/O controller 420 may also be used to perform and/or be a means for performing other steps and features set forth in the instant disclosure.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution. In certain embodiments, communication interface 422 may perform and/or be a means for performing, either alone or in combination with other elements, one or more of the identifying, disabling, detecting, switching, directing, reconfiguring, handling, and/or performing steps disclosed herein. Communication interface 422 may also be used to perform and/or be a means for performing other steps and features set forth in the instant disclosure.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device. In at least one embodiment, input device 428 may perform and/or be a means for performing, either alone or in combination with other elements, one or more of the identifying, disabling, detecting, switching, directing, reconfiguring, handling, and/or performing steps disclosed herein. Input device 428 may also be used to perform and/or be a means for performing other steps and features set forth in the instant disclosure.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

In certain embodiments, storage devices 432 and 433 may be used, for example, to perform and/or be a means for performing, either alone or in combination with other elements, one or more of the identifying, disabling, detecting, switching, directing, reconfiguring, handling, and/or performing steps disclosed herein. Storage devices 432 and 433 may also be used to perform and/or be a means for performing other steps and features set forth in the instant disclosure.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
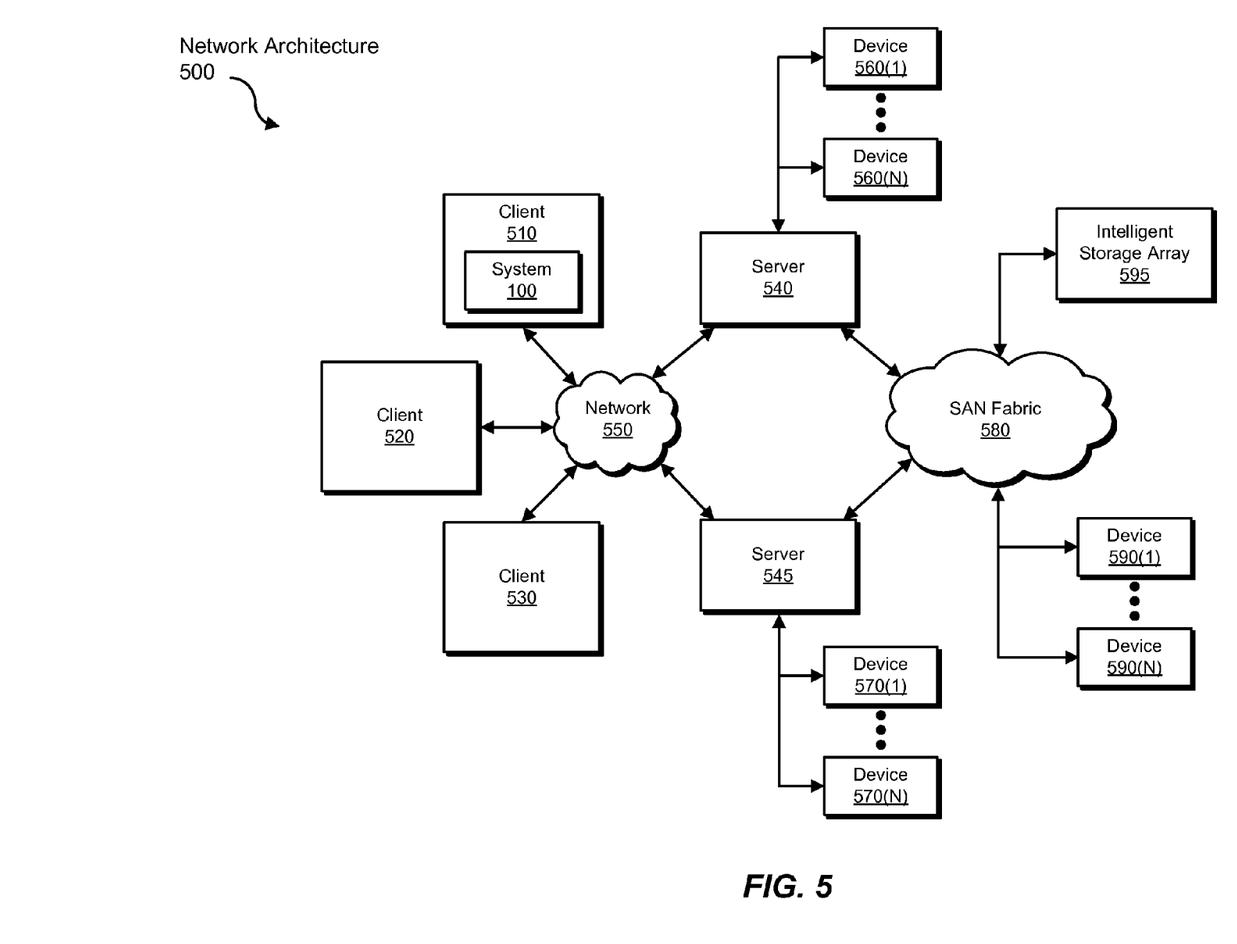
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. Client systems 510, 520, and 530 generally represent any type or form of computing device or system, such as exemplary computing system 410 in FIG. 4. In one example, client system 510 may include system 100 from FIG. 1.

Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550. Accordingly, network architecture 500 may perform and/or be a means for performing, either alone or in combination with other elements, one or more of the identifying, disabling, detecting, switching, directing, reconfiguring, handling, and/or performing steps disclosed herein. Network architecture 500 may also be used to perform and/or be a means for performing other steps and features set forth in the instant disclosure.

As detailed above, computing system 410 and/or one or more components of network architecture 500 may perform and/or be a means for performing, either alone or in combination with other elements, one or more steps of an exemplary method for handling path failures to active-passive storage arrays.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a backup system into a backup system adaptable to path failures.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for handling path failures to active-passive storage arrays, at least a portion of the method being performed by a computing device comprising at least one processor, the method comprising:
    identifying a host system with multiple I/O paths to an active-passive storage array;
    identifying a backup system operating for the host system, the backup system having multiple I/O paths to the active-passive storage array;
    disabling at least one secondary path from the backup system to the active-passive storage array;
    detecting a path failure;
    reconfiguring the backup system to access the active-passive storage array through an I/O path to the host system.

2. The computer-implemented method of claim 1, wherein identifying the backup system comprises identifying a continuous data protection system.

3. The computer-implemented method of claim 1, wherein detecting the path failure comprises detecting a path failure from the backup system to the active-passive storage array.

4. The computer-implemented method of claim 1, wherein detecting the path failure comprises detecting a path failure from the host system to the active-passive storage array.

5. The computer-implemented method of claim 1, wherein reconfiguring the backup system to access the active-passive storage array through the host system comprises switching the backup system to a direct-attached storage mode.

6. The computer-implemented method of claim 1, wherein reconfiguring the backup system to access the active-passive storage array through the host system comprises at least one of:
    directing I/O requests from the backup system to a splitter on the host system;
    directing I/O requests from the backup system to an agent on the host system.

7. The computer-implemented method of claim 1, wherein detecting the path failure comprises detecting the path failure during at least one of:
    a backup operation by the backup system;
    a restore operation by the backup system.

8. The computer-implemented method of claim 1, further comprising performing at least one of:

a backup operation through the backup system, at least a part of the backup operation routing through the host system to the active-passive storage array;

a restore operation through the backup system, at least a part of the restore operation routing through the host system to the active-passive storage array.

9. The computer-implemented method of claim 1, wherein disabling at least one secondary path from the backup system to the active-passive storage array comprises disabling all secondary paths from the backup system to the active-passive storage array.

10. A system for handling path failures to active-passive storage arrays, the system comprising:
an identification module programmed to:
identify a host system with multiple I/O paths to an active-passive storage array;
identify a backup system operating for the host system, the backup system having multiple I/O paths to the active-passive storage array;
a disabling module programmed to disable at least one secondary path from the backup system to the active-passive storage array;
a detection module programmed to detect a path failure;
a reconfiguration module programmed to reconfigure the backup system to access the active-passive storage array through an I/O path to the host system;
at least one processor configured to execute the identification module, the disabling module, the detection module, and the reconfiguration module.

11. The system of claim 10, wherein the identification module is programmed to identify the backup system by identifying a continuous data protection system.

12. The system of claim 10, wherein the detection module is programmed to detect the path failure by detecting a path failure from the backup system to the active-passive storage array.

13. The system of claim 10, wherein the detection module is programmed to detect the path failure by detecting a path failure from the host system to the active-passive storage array.

14. The system of claim 10, wherein the reconfiguration module is programmed to reconfigure the backup system to access the active-passive storage array through the host system by switching the backup system to a direct-attached storage mode.

15. The system of claim 10, wherein the detection module is programmed to detect the path failure by detecting the path failure during at least one of:
a backup operation by the backup system;
a restore operation by the backup system.

16. The system of claim 10, wherein the disabling module is programmed to disable at least one secondary path from the backup system to the active-passive storage array by disabling all secondary paths from the backup system to the active-passive storage array.

17. The system of claim 10, wherein the reconfiguration module is programmed to reconfigure the backup system to access the active-passive storage array through the host system by at least one of:
directing I/O requests from the backup system to a splitter on the host system;
directing I/O requests from the backup system to an agent on the host system.

18. The system of claim 10, further comprising a backup module programmed to perform at least one of:
a backup operation through the backup system, at least a part of the backup operation routing through the host system to the active-passive storage array;
a restore operation through the backup system, at least a part of the restore operation routing through the host system to the active-passive storage array.

19. A non-transitory computer-readable-storage medium comprising one or more computer-executable instructions that, when executed by at least one processor of a computing device, cause the computing device to:
identify a host system with multiple I/O paths to an active-passive storage array;
identify a backup system operating for the host system, the backup system having multiple I/O paths to the active-passive storage array;
disable at least one secondary path from the backup system to the active-passive storage array;
detect a path failure;
reconfigure the backup system to access the active-passive storage array through an I/O path to the host system.

20. The non-transitory computer-readable-storage medium of claim 19, wherein identifying the backup system comprises identifying a continuous data protection system.

* * * * *